United States Patent
Aggarwal et al.

(10) Patent No.: US 11,003,789 B1
(45) Date of Patent: May 11, 2021

(54) DATA ISOLATION AND SECURITY SYSTEM AND METHOD

(71) Applicant: Epsilon Data Management, LLC, Irving, TX (US)

(72) Inventors: Neeraj Aggarwal, Aurora, IL (US); Dax Michael Bays, North Richland Hills, TX (US); Edgar Denny, Reading, MA (US); Ilya G. Ehrlich, Newton, MA (US); Michael Henry Hurley, Arlington, MA (US)

(73) Assignee: Epsilon Data Management, LLC, Irving, TX (US)

( * ) Notice: Subject to any disclaimer, the term of this patent is extended or adjusted under 35 U.S.C. 154(b) by 0 days.

(21) Appl. No.: 16/874,886

(22) Filed: May 15, 2020

(51) Int. Cl.
*G06F 7/04* (2006.01)
*H04N 7/16* (2011.01)
*G06F 21/62* (2013.01)
*G06F 16/9535* (2019.01)

(52) U.S. Cl.
CPC ...... *G06F 21/6227* (2013.01); *G06F 16/9535* (2019.01); *G06F 21/6245* (2013.01)

(58) Field of Classification Search
None
See application file for complete search history.

(56) References Cited

U.S. PATENT DOCUMENTS

| | | |
|---|---|---|
| 5,848,396 A | 12/1998 | Gerace |
| 5,991,735 A | 11/1999 | Gerace |
| 6,078,918 A | 6/2000 | Allen et al. |
| 7,756,744 B2 | 7/2010 | Schiff et al. |
| 7,895,078 B2 | 2/2011 | Schiff et al. |
| 8,452,657 B2 | 5/2013 | Schiff et al. |
| 8,788,843 B2 * | 7/2014 | Kopasz ................. H04L 63/102 713/189 |
| 8,954,486 B2 | 2/2015 | Schiff et al. |
| 9,424,593 B2 | 8/2016 | Schiff et al. |
| 9,754,114 B2 * | 9/2017 | Singler .................. G06F 16/27 |
| 2002/0161722 A1 * | 10/2002 | Matsushima ........ G06Q 20/206 705/67 |
| 2004/0139315 A1 * | 7/2004 | Tokutani ............. H04L 63/0435 713/156 |

(Continued)

FOREIGN PATENT DOCUMENTS

WO 2011127359 A2 10/2011

OTHER PUBLICATIONS

Acxiom AbiliTec, website, screenshot captured Jun. 19, 2020, Acxiom LLC, https://marketing.acxiom.com/US-Parent-Recognition-June2016_MainLP1.html?CID=7011A000000mAHI&LS=Ad.

(Continued)

*Primary Examiner* — Jeffrey Nickerson
*Assistant Examiner* — Vadim Savenkov
(74) *Attorney, Agent, or Firm* — Hitchcock Evert LLP

(57) ABSTRACT

The invention relates to a data isolation system for targeted services. The system includes separate ID management systems used by data holders, service providers and additional parties. The ID management systems reconcile IDs between the systems without sending restricted information from a data holder or other party. In some embodiments, the system may reconcile separate third party IDs to determine common people or entities represented by the IDs.

14 Claims, 7 Drawing Sheets

(56) References Cited

U.S. PATENT DOCUMENTS

| | | | |
|---|---|---|---|
| 2005/0283621 A1* | 12/2005 | Sato | H04L 9/3273 |
| | | | 713/189 |
| 2008/0034008 A1* | 2/2008 | Burke | G06F 16/9574 |
| 2011/0251896 A1 | 10/2011 | Impollonia et al. | |
| 2013/0247083 A1 | 9/2013 | Impollonia et al. | |
| 2013/0268357 A1* | 10/2013 | Heath | G06Q 30/02 |
| | | | 705/14.53 |
| 2013/0290256 A1* | 10/2013 | Barrall | G06F 16/183 |
| | | | 707/634 |
| 2016/0180375 A1 | 6/2016 | Rose et al. | |
| 2017/0322992 A1* | 11/2017 | Joseph | G06F 16/27 |
| 2018/0212931 A1* | 7/2018 | Zhou | G06Q 30/0609 |
| 2018/0352430 A1* | 12/2018 | Mansour | H04L 63/104 |
| 2019/0066150 A1 | 2/2019 | Nowlan et al. | |
| 2019/0066154 A1 | 2/2019 | Nowlan et al. | |
| 2020/0082922 A1* | 3/2020 | Bacastow | H04L 63/10 |
| 2020/0320207 A1* | 10/2020 | Beno | G06F 21/604 |

OTHER PUBLICATIONS

Welcome to a World of Marketing to One, digital brochure, downloaded Jun. 17, 2020, Acxiom Corporation, www.acxiom.com.

How well do you know customers—really?, website, screenshot captured Jun. 19, 2020, Experian Information Solutions, Inc., https://www.experian.com/marketing-services/identity-resolution.

MarketingConnect, digital product sheet, downloaded Jun. 17, 2020, Experian Information Solutions, Inc., experianmarketingservices.com.

LiveRamp, website, screenshot captured Jun. 19, 2020, LiveRamp, https://liveramp.com.

Merkle M1, website, screenshot captured Jun. 19, 2020, Merkle Inc., https://www.merkleinc.com/m1.

Merkury, website, screenshot captured Jun. 19, 2020, Merkle Inc., https://merkury.merkleinc.com.

The Neustar Identity DMP, website, screenshot captured Jun. 19, 2020, Neustar, Inc., https://www.home.neustar/resources/product-literature/neustar-identity-data-management-platform.

The Neustar IDMP, digital product sheet, downloaded Jun. 17, 2020, Neustar, Inc., https://www.home.neustar.

Zeta Marketing Platform, Power Customer Growth, website, screenshot captured Jun. 19, 2020, Zeta Global, https://zetaglobal.com/zeta-marketing-platform.

Epsilon PeopleCloud, website, screenshot captured Jun. 24, 2020, Epsilon Data Management, LLC, https://us.epsilon.com/epsilon-peoplecloud-overview.

Publicis Groupe launches The Pact, Powered by Epsilon to Guarantee Business Results for U.S. Midsize Companies, press release, Apr. 30, 2020, Publicis Groupe, https://www.publicisgroupe.com/en/news/press-releases/publicis-groupe-launches-the-pact-powered-by-epsilon.

* cited by examiner

DATA ISOLATION AND SECURITY SYSTEM AND METHOD

FIELD OF THE DISCLOSURE

The invention relates to security and privacy across networks and parties.

BACKGROUND

Many companies have multiple types of information, including confidential information. They may use this information for providing services, goods or advertising to specific people or populations. Some companies coordinate with other companies to evaluate the information or facilitate services based on the information. However, companies want to control the release of certain confidential information. In fact, certain jurisdictions require heightened requirements relating to certain information, such as personally identifiable information (PII).

Some systems use a single database to hold aggregated information. A service provider using an aggregated system may require companies to provide personal information in a company's possession in order to provide the service. This information is aggregated in the service provider's database. The service provider and the company rely on the security protocols for the service provider database and system to maintain the confidentiality of information. Additional parties may also provide information to the service provider, which aggregates the information.

In a targeted advertising system, the service provider may analyze the aggregated information to determine recipients for an advertising campaign. The service provider may then facilitate the campaign using the personally identifiable information stored in the aggregated database.

Some companies may include their own systems for facilitating advertising. Some of these companies do not share personal information with other entities, but require vendors or other parties to send personal information for the company to use or reconcile against its own information. These companies may utilize a cross-reference table to reconcile information from the vendor.

Some advertising vendors rely on information that is not personally identifiable because they direct communication to computers based on cookies, web addresses or other non-PII information. These targeted advertising systems are limited to information associated with an unknown person associated with the user profile tied to the computer.

SUMMARY

The present innovation discloses systems and methods to provide personally targeted services for companies, without requiring the company to release PII to the service provider. This allows the company to control its client's PII and receive the targeted service benefits.

In some embodiments, the system includes separate identity management systems and databases. One is housed by the company, which includes its customer data. The company may be referred to as a "customer data holder" to describe its role in the system example. Another identity management system and database is housed by the service provider. The identity management systems may each include isolation databases that hold restricted information, such as customer PII or other personal information. The isolation databases may also be referred to as PII databases for illustrative purposes.

The system may include a separate database to reconcile profiles without transferring usable PII from the company. A profile may refer to an individual, a household, an IP address, a business or a group. In some embodiments, the separate database may be an encoded database, such as a hashed database. The separate database may be housed in the service provider system or as an independent system. In some embodiments, the service provider system receives the PII from sources other than the customer. The service provider PII may be used to reconcile common profiles with the customer data holder through the hashed database. In such embodiments, matching hashes indicate common profiles while unmatched hashes indicate distinct profiles.

A service provider system may include an analysis hub, which analyzes collected non-PII attributes to provide a targeted service. The non-PII attributes may be collected from the service provider, the customer data holder and other external sources. Attributes from the customer data holder may be received with a customer ID and hashed customer PII. The customer ID does not include any customer PII. The hashed customer PII is not decipherable unless the hash algorithm and the customer PII is already known. The hashed customer PII may be a hash created from a portion of the available PII. In some embodiments the customer ID is created by an ID management solution system used by the data holder. In some embodiments, the service provider ID management solution may create the customer ID.

In some embodiments, the analysis hub provides a service to be fulfilled using PII. If PII exists in the service provider, the service is fulfilled through the service provider fulfilment hub. If PII does not exist in the service provider system, the service is fulfilled through a customer data holder fulfilment hub. The fulfilment may be sent through any number of outbound channels.

The system may be designed to regularly update and reconcile information as it is received from multiple sources. When the service provider receives new or updated information, the system may conduct an update and reconciliation process. The service provider may send updated PII or other information to the customer data holder along with a service provider ID. The customer data holder receives the information and updates its database and ID management system to reflect new information. The customer data holder then sends hashed PII, customer IDs and other information to the service provider's hashed database in the service provider ID management system for reconciliation. In some embodiments, the transferred data may be limited to any new or updated profiles.

In some embodiments, the system may be used as a clearinghouse to reconcile common profiles between customers and partners. Each customer and partner may have their own separate PII database and an ID management system with an internal cross-reference database. Each customer data holder and partner may also receive feeds from external data sources. Embodiments of the system may include multiple customer data holders and partner participants.

The service provider also includes a service provider ID management system. The ID management system may include multiple databases, such as a service provider PII to ID cross reference database, a first hashed database and a second hashed database. In some embodiments, the first hashed database is a cross reference database to match hashed customer PII to a service provider ID and the second hashed database is a cross reference database to match hashed partner PII to a service provider ID. In some embodiments, the service provider ID management solution creates a solution ID that may be used throughout the system.

The service provider can confirm the overlapping of hashed PII from the customer and the partner using the solution ID to reconcile the overlap for each entity. In this situation, the overlapping PII may be confirmed without the data holder or partner sharing any PII. In addition, the system may confirm an overlap in data holder and partner PII even if the service provider does not have the PII.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
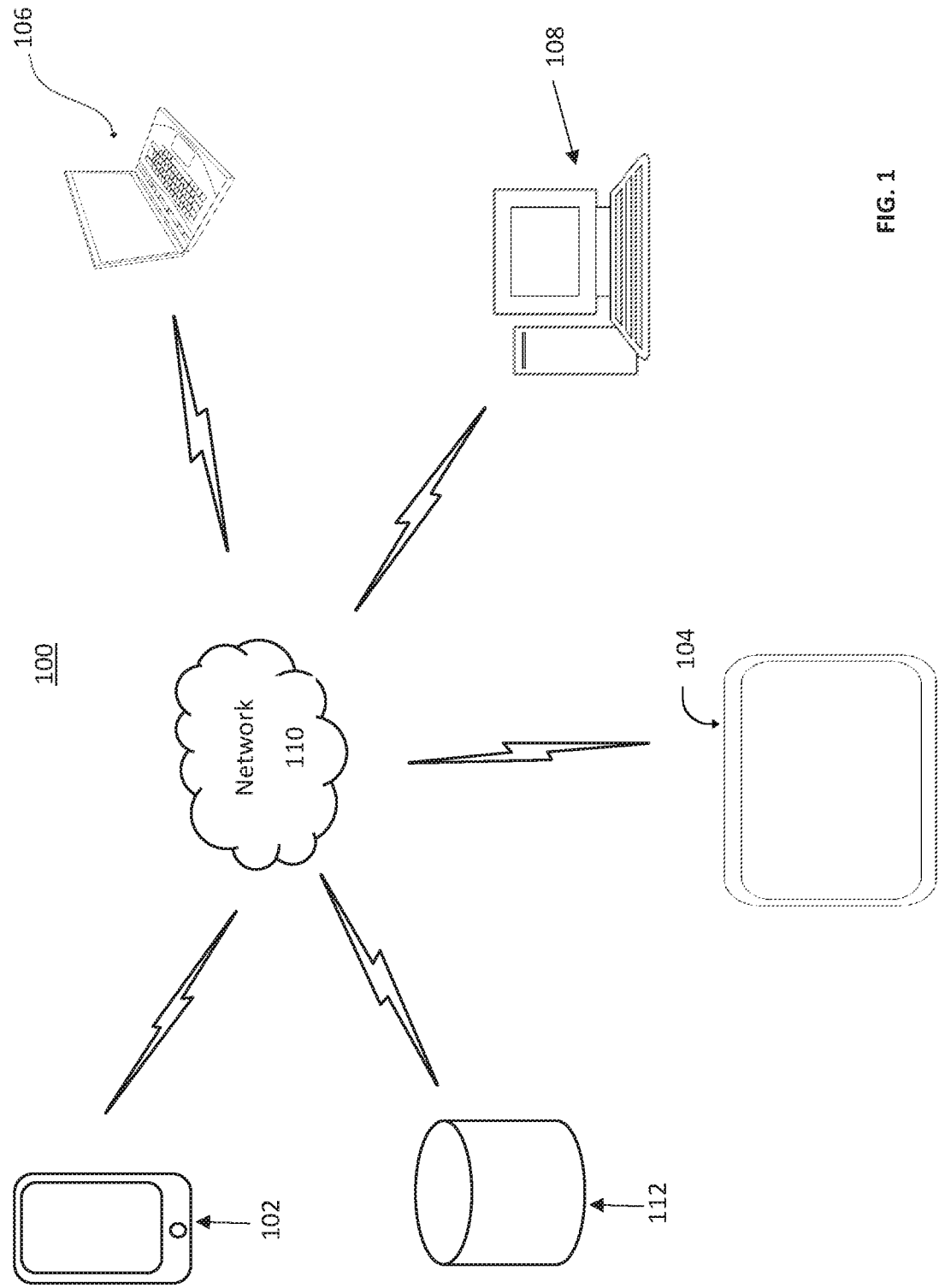
FIG. 1 shows an embodiment of a network diagram.

FIG. 1 discloses a networked system 100, which illustrates components that may be part of embodiments of the data isolation and security systems. The networked system 100 includes multiple remote devices that communicate over a network 110. The network 110 may be any type of communication network, including long range communication systems, such as cellular communication, the Internet and others, and near field communication systems, such as Bluetooth communication, Wi-Fi communication and others. In addition, the network 110 may use public or private networks.

The remote devices 102-108 depicted include a mobile phone 102, a tablet 104, a computer system 108 and a laptop 110. This embodiment also shows a database 112 that communicates over the network. The networked system 100 may include any number and type of the remote devices 102-108, network 110 and the database 112.

The remote devices 102-108 illustrate user interfaces. User commands and requests may be entered through the user interfaces of the remote devices 102-108. In addition, the remote devices 102-108 may also be used for analysis. In this embodiment, the database 112 is in remote communication with the remote devices over the network 110. In some embodiments, the remote devices 102-108 may be directly connected or associated with a database 112.

Figure 2:
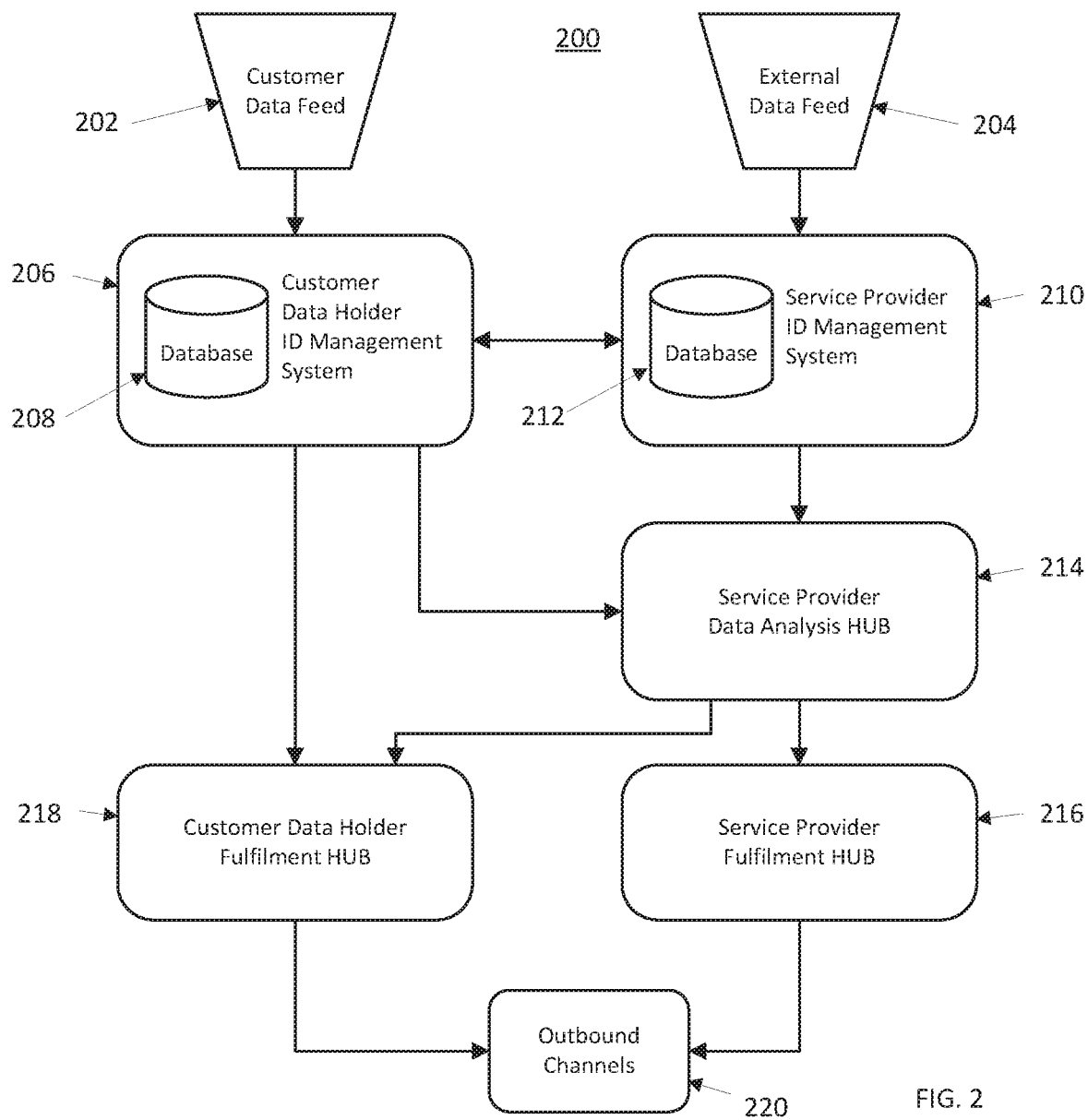
FIG. 2 shows an embodiment of a networked data isolation system.

FIG. 2 shows a data isolation system 200 diagram and flow. The system 200 begins with the collection or receipt of data. The data may be correlated with a solution ID used throughout the data isolation system 200 as a common ID. In other embodiments, each entity may assign separate IDs and use the solution ID to reconcile the separate IDs.

The customer data feed 202 provides customer related information to a customer data holder. The customer data holder may be any company or entity that receives customer information that may include PII, such as banks or other financial institutions, medical facilities, legal institutions or other companies. The customer data feed 202 may be electronic data sources about the customer, electronic forms completed by or for a customer, paper forms completed by or for a customer that are later input or converted to electronic information, or other data sources.

Similarly, a service provider receives or collects information through an external data feed 204. The service provider may be any company or entity that provides a service to other parties, including customer data holders. The services provided may be any type of targeted service or advertising campaign. For example, the data isolation system 200 will be discussed in context with a targeted advertising service.

In some embodiments, the external data feed 204 may be directed in part or in whole to the customer data holder. The external data feed 204 may be sent to both the service provider and the data holder. In other embodiments, the external data feed 204 may solely be provided to the data holder.

The external data feed 204 may provide additional information that relates to a customer of the data holder and information that relates to other people or entities that are not yet customers of the data holder. External data feed 204 may include electronic data sources, electronic forms, paper forms that are later input or converted to electronic information, government data sources, credit information sources, user activity sources or other data sources. For an example, the external data feed 204 may include the national address change registry update. In some embodiments, the service provider may also have data collection systems, such as social media tracking systems, electronic cookie tracking systems and other data collection systems. These systems may collect information that may be used in providing a targeted service. For example, the information may include demographic data, sales activities, interests, relationship information and other information.

This embodiment includes a customer data holder ID management system 206 including a data holder database 208 and a service provider ID management system 210, including a service provider database 212. The ID management systems 206 and 210 may be independent instances of the same software operating on distinctly housed systems or controlled separately by the data holder and the service provider. While the systems are separate, they communicate over a network, such as the network 110, to reconcile certain information. The reconciliation process does not require communication of usable PII from the data holder.

The ID management systems 206 and 210 may each assign solution IDs when data is received. During the reconciliation process, the solution IDs may be updated based on confirmation that two solution IDs refer to the same customer. In some embodiments, one solution ID is a temporary solution ID that is subsequently replaced during the reconciliation process. For example, the customer data holder ID management system 206 may assign a temporary solution ID that is replaced with the solution ID assigned by the service provider ID management system 210 during the reconciliation process. In such embodiments, the permanent or long-term solution ID may have a first ID structure and a temporary solution ID may have a secondary structure to prevent overlap in the long-term and temporary solution IDs. For example, the first character in a temporary ID may always be a letter while the long-term IDs may always start with a number.

In some embodiments, the data holder database 208 may be broken into multiple databases housing distinct types of information. For example, the customer data holder ID management system 206 may include a PII database (or data holder isolation database) and a non-PII database that provides a cross-reference database to a solution ID. For example, the data holder system may rely on separate customer IDs outside of the ID management system, and the cross-reference database may store correlations between solution IDs and the data holder's customer IDs. In some embodiments, the solution IDs may include service provider assigned solution IDs and data holder assigned solution IDs. These may be referred to as service provider IDs and customer IDs. A cross-reference database may store correlated service provider and customer IDs in some embodiments.

In other embodiments, the data holder ID management system 206 may include other information, such as customer attributes. The customer attributes and other non-PII information may be stored in a separate database or system from the customer data holder ID management system 206.

The customer data holder ID management system 206 may incorporate one or more security protocols to limit access and encrypt information. In some embodiments, the customer data holder may have different security protocols within the customer data holder ID management system 206. For example, the customer data holder ID management system 206 may have higher level security protocols for a database containing customer PII than another database.

The service provider database 212 may also be split into multiple databases, including a PII database and an encoded database for reconciliation. The PII database may include information received and compiled from the external data feed 204 and any internal data sources, such as personal information, confidential information or PII. In some embodiments, the PII database may be limited to storing PII information, while additional non-PII information is stored in a separate database. For example, the non-PII information may be stored in a database within or associated with a service provider data analysis hub 214. In some embodiments, solution IDs or service provider IDs may represent an individual set of personal information, such as PII, associated with a person or entity.

In other embodiments, the PII and non-PII information received and compiled from the external data feed 204 and any internal data sources may be stored in the PII database. In some embodiments, the service provider may not be permitted to share certain restricted information. For example, the service provider may receive credit information from the external data feed 204 that may not be shared with a financial institution.

The service provider ID management system 210 and the customer data holder ID management system 206 communicate information and solution IDs over a network 110 to reconcile data between the two databases 208 and 212. The exchange of information does not include any usable PII from the customer data holder ID management system 206.

The service provider data analysis hub 214 in this embodiment receives information from the customer data holder ID management system 206 or a separate customer information system, such as customer attributes. The service provider data analysis hub 214 may not include any Phi in some embodiments. In such embodiments, the customer data holder ID management system 206 may limit any data to reconciled solution IDs corresponding to non-PII attributes sent from another data holder system or facilitated through the customer data holder ID management system 206. The service provider data analysis hub 214 also receives information from the service provider ID management system 210 or another informational system, such as non-PII information and attributes from the external data feed 204. The data analysis hub 214 analyzes the received information to identify a target audience. For example, the data analysis hub 214 may analyze purchasing habits, website activity and location information to provide targeted advertising campaign for a rewards-based credit card opportunity to customers and potential customers of a banking institution. The location information may be used to ensure that customers are in an area serviced by the banking institution. The data analysis hub 214 may use known or developed techniques for maximizing the data holder's targeted campaign. The data analysis hub 214 may identify the solution IDs for the target audience through the analysis.

Once the campaign recipients are identified by the solution IDs, the data analysis hub 214 sends the campaign for fulfilment. The campaign may be fulfilled through a customer data holder fulfilment hub 218 or service provider fulfilment hub 216. The data analysis hub 214 will send the campaign to the service provider fulfilment hub 216 if the service provider ID management system 210 includes the PII for the solution ID. If the PII is not available from the service provider ID management system 210, the campaign will be sent to the customer data holder fulfilment hub 218 along with the solution ID.

The fulfilment hubs 216 and 218 combine PII with the campaign for executing the service through outbound channels 220. The service provider fulfilment hub 216 combines the PII available from the service provider ID management system 210 with the campaign and sends it to the outbound channels 220. The customer data holder fulfilment hub 218 combines the customer PII from the customer data holder ID management system 206 with the campaign and sends it to the outbound channels 220.

In some embodiments, the customer data holder ID management system 206 may be a computer system 108 or server with a database 112. The customer data holder ID management system may include a processor or processing system, including one or more integrated circuits with processors and operational memory, such as executable instructions. In addition, the data holder system may include a data holder network communication component to conduct network communications. The network communication component may be any structure for communication over a network, such as a network card, cellular communication chip, Bluetooth® communication module, WiFi® communication module or other network communication structure. In some embodiments, the computer system 108 is connected via a network 110 to a cloud system operating as the database 112. In other embodiments, the database 112 and customer data holder ID management system 206 may be hosted in a cloud environment. Other embodiments may split the customer data holder ID management system 206 into multiple environments. For example, a PII database may be hosted on a local server while the customer attributes may be hosted on a cloud server.

The service provider ID management system 210 may also be hosted locally, hosted in a cloud environment or split between hosting environments. In addition, the service provider data analysis hub 214 may be hosted with the service provider ID management system 210 or as a separate system. For example, the service provider data analysis hub 214 may be provided on a separate computer system, such as the computer 108, a server or a cloud environment. As an example, the service provider ID management system may include a processor or processing system, including one or more integrated circuits with processors and operational memory, such as executable instructions. In addition, the service provider system may include a service provider network communication component to conduct network communications. The network communication component may be any structure for communication over a network, such as a network card, cellular communication chip, Bluetooth® communication module, WiFi® communication module or other network communication structure.

The fulfilment hubs 216 and 218 may be part of the respective ID management systems 206 and 210 or separate fulfilment provider systems that receive the information from each ID management system 206 and 210. In some embodiments, the outbound channels 220 may also be integrated with the service provider fulfilment hub 216, the customer data holder fulfilment hub 218 or both. In other embodiments, the outbound channels 220 may be separate from the fulfilment hubs 216 or 218.

Figure 3:
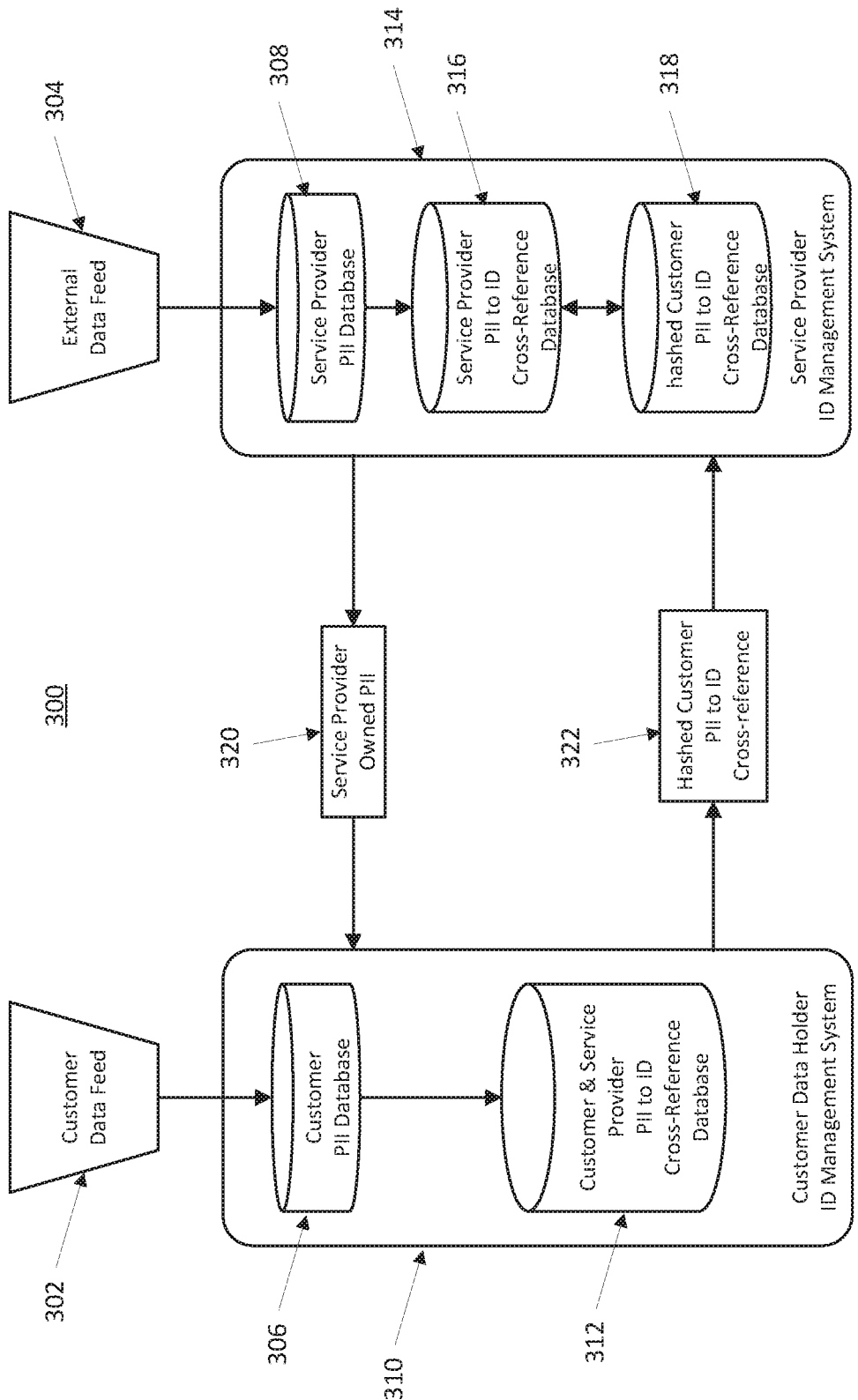
FIG. 3 shows an embodiment of a reconciliation process for the data isolation system.

FIG. 3 shows an embodiment of a data reconciliation system 300, which reconciles information between a customer data holder ID management system 310 and a service provider ID management system 314. In some embodiments, the data reconciliation system 300 may operate as the reconciliation system for the data isolation system 200.

Similar to the data isolation system 200, the customer data holder ID management system 310 may receive information from a customer data feed 302, and the service provider ID management system 314 may receive information from an external data feed 304. In other embodiments, the external data feed 304 may be directed in part or in whole to the data holder ID management system 310. These two data feeds 302 and 304 may include various sources of information, including personal and non-PII information.

In this embodiment, the customer data holder ID management system 310 includes a customer PII database 306 and customer and service provider PII to ID cross-reference database 312. The PII database 306 stores customer PII received by the data holder through the customer data feed 302. The customer and service provider cross-reference database 312 may store solution IDs with cross-references to customer PII entries in the customer PII database 306. In some embodiments, the cross-reference database 312 may include additional customer related information associated with the solution ID for matching a customer profile.

This customer and service provider cross-reference database 312 may use the customer PII database 306 for reference during the matching process to determine if a solution ID is new, matches an existing solution ID or partially matches an existing solution ID. At all times, the PII remains in the customer data holder ID management system 310 during the cross-reference matching process. In some embodiments, the customer and service provider cross-reference database 312 may not include customer attributes and non-PII information apart from the solution ID and customer IDs. In other embodiments, the customer and service provider cross-reference database 312 may include additional customer attributes and non-PII customer information.

In some embodiments, the PII database 306 may be separate from the customer data holder ID management system 310. The PII database 306 may be locally stored or stored in a remote environment, such as a cloud environment.

The customer data holder ID management system 310 manages the storage and security of the PII. One aspect of the additional security provided by the customer data holder ID management system 310 is the isolation of PII from exchange with the service provider. The customer data holder ID management system 310 may also include other security protocols to protect the PII.

In this embodiment, the service provider ID management system 314 includes a service provider PII database 308, a service provider PII to ID cross-reference database 316 and a hashed customer PII to ID cross-reference database 318. The service provider ID management system 314 stores PII received from the external data feed 304 or acquired through other internal systems in the service provider PII database 308.

The service provider PII to ID cross reference database 316 correlates solution IDs with PII in the service provider PII database 308. When new PII data is received that does not correlate to an existing solution ID, the service provider ID management system 314 may assign a new solution ID. During the reconciliation process, the service provider PII to ID cross-reference database 316 maintains solution IDs for people or entities based on information that is available to the service provider ID management system 314. In some embodiments, the available information may be PII from the external data feed 304 or another source. Some service provider ID management systems 314 may contain PII and related information, such as user names, IP addresses and other information, without containing any other non-PII information. Other service provider ID management systems 314 may include non-PII information received from the external data feed 304 or from the customer data holder. In some embodiments, the non-PII information may be stored in a different database and system while the solution ID is managed in the service provider ID management system 314.

The hashed customer PII to ID cross-reference database 318 is used to correlate customers of the data holder with people or entities identified in the service provider ID management system 314. These correlations may be based on matching hashed PII from the customer data holder and the service provider. In some embodiments, the service provider ID management system 314 may be able to correlate additional solution IDs based on certain information, such as common website cookies, shopping habits, social network information, usernames, demographic data or other information.

During the reconciliation process, the service provider ID management system 314 may share permitted information from the service provider PII database 308 with the customer data holder ID management system 310. The service provider ID management system 314 sends service provider transmission 320 to the customer data holder ID management system 310. In this embodiment, the service provider PII is labeled service provider owned PII to indicate ability to transmit the PII. Those skilled in the art will recognize that this ability to transmit may be based on the service provider's license, control or possession of the service provider PII, and the service provider may not own rights to the collected PII. In some embodiments, the service provider may be permitted to share PII with the data holder even when the customer data holder stored PII may not be shared with the service provider. In some embodiments, the service provider transmission 320 may include permitted information and a solution ID with the service provider owned PII.

The customer data holder ID management system 310 receives the service provider transmission 320. The customer data holder ID management system 310 then updates information in the customer PII database 306 and the customer and service provider PII to ID cross-reference database 312 with any new or changed data. The customer and service provider PII to ID cross-reference database 312 or other analysis system may correlate the service provider PII or solution ID with an existing solution ID for the customer in the customer data holder ID management system 310. This correlation process may identify matching solution IDs and PII, partially matching solution IDs and PII or unmatched solution IDs and PII.

For matching solution IDs and PII, no update may be necessary. The customer and service provider PII to ID cross-reference database 312 may indicate the receipt of matching information in some embodiments. For partially matched solution IDs and PII, the information associated with the solution ID entry in the customer PII database 306 or other database may be updated. Any solution IDs and PII that are unmatched may be entered as new solution ID entries in the customer PII database 306 or other data holder database. In addition, the customer PII database 306 may include additional customers with solution IDs that are not correlated to the solution IDs and PII received from the service provider transmission 320.

Once the customer data holder ID management system 310 is updated, it may apply a one-way encryption to the information and send it to the service provider ID management system 314. For example, the customer data holder ID management system 310 may apply a hash algorithm to the customer PII. The customer data holder ID management system 310 then sends a data holder transmission 322 to the service provider ID management system 314. The data holder transmission 322 includes the hashed customer PII characters for reconciliation and may include corresponding solution IDs. In some embodiments, the information may be limited to partially matched, unmatched and data holder only solution IDs.

The hash algorithm converts the selected PII information into a series of characters. The hash conversion is designed to encode information in a way that cannot be decoded. Information that includes a slight difference entering the hash algorithm may result in a significant difference in the hash output. The only way to determine the hash characters is to put the same information into the same hash algorithm to compare the results. The hashed customer PII is not usable PII information because the receiving party must have the same PII and hash algorithm in order to determine that the received hashed PII is for a specific person. Because the hashed customer PII is not useable, any data theft of the hashed customer PII does not compromise the original customer PII in the customer PII database 306. Some embodiments may introduce additional layers of security to the system by applying a specialized format to the PII for the hashing process, hashing different portions of the PII separately and sending each hashed portion together for analysis, integrating a versioning or time-based system with rotating encryption or hash keys, or other additional security steps. As an example, the ID management systems 310 and 314 may hash a person's first name separately from a last name and use both as the hashed PII entry for a person. As another example, each hashed PII entry received from the data holder ID management system 310 may include a version number corresponding to the hash algorithm used.

In some embodiments, the customer data holder ID management system 310 may also send information including customer attributes and non-PII information in a native form or using a specific encryption that may be decrypted by the service provider ID management system 314 for additional analysis.

The service provider ID management system 314 hashes the service provider PII contained in the service provider PII database 308. The service provider ID management system 314 uses the same hash algorithm and formats the PII the same way as the customer data holder ID management system 310. In some embodiments, the service provider ID management system 314 may create a series of hashes for a solution ID that includes alternative PII information, such as nicknames, titles, designations or other information that may affect the hash. After creating the service provider hashed PII, the service provider ID management system 314 compares the service provider hashed PII to the received customer hashed PII to determine if the service provider PII database 308 includes the customer PII.

If the service provider hashed PII and the customer data holder hashed PII match, the service provider ID management system 314 may update the corresponding service provider PII to ID cross-reference database 316 or other service provider database. In some embodiments, confirmation that hashed PII characters match may determine that a solution ID corresponds to the same person or entity in the customer data holder and service provider ID management systems 310 and 314. In some embodiments, the databases may be updated with new or changed non-PII customer information or attributes received in the data holder transmission 322.

If the service provider hashed PII and the customer data holder hashed PII do not match, the service provider ID management system 314 may conduct additional analysis of non-PII information, if available, to determine whether the information relates to an existing solution ID. This second analysis may use related information, such as credit bureau information, usernames, website logins and other information that may support a determination that the received information corresponds to an existing solution ID. If this second analysis results in a matched ID, the service provider ID management system 314 may update the data entries associated with the solution ID.

If the service provider ID management system 314 fails to identify a match, the remaining solution IDs received in the customer data holder transmission 322 are treated as new people or entities. In some embodiments, the solution ID from the customer is included in the service provider ID management system 314. In other embodiments, the service provider ID management system 314 may assign new solution IDs. These new solution IDs will not be associated with any PII at this time because the customer data holder transmission does not include PII. The service provider ID management system 314 may subsequently receive PII for the same customer through the external data feed 304.

Based on this matching process, the service provider ID management system 314 reconciles the solution IDs in the service provider ID management system 314. Once completed, the service provider ID management system 314 may send a second service provider transmission 320 to the customer data holder ID management system 310. The second service provider transmission 320 may indicate the identified correlations based on customer information and attributes, and include new and updated solution IDs.

Figure 4:
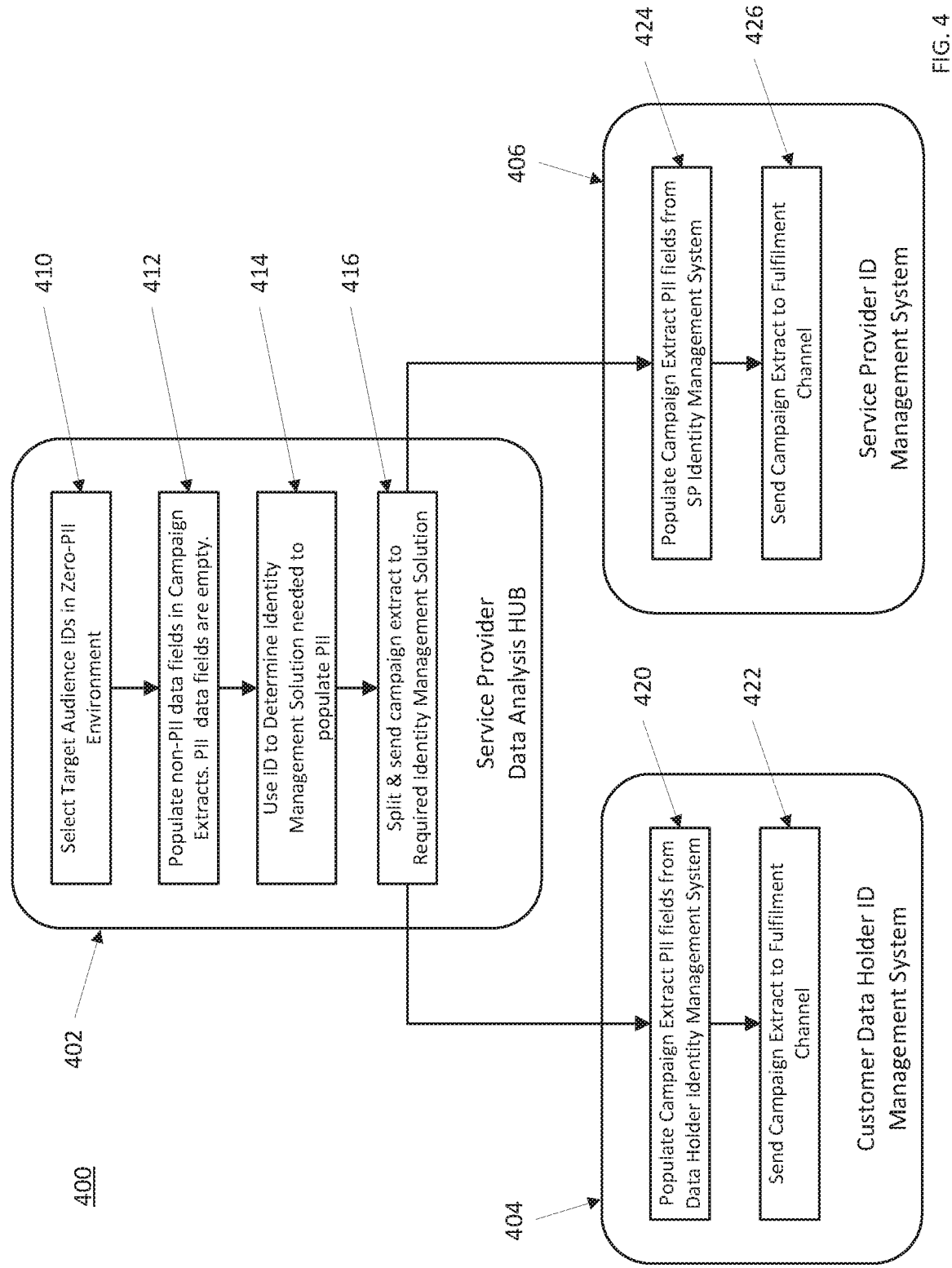
FIG. 4 shows an embodiment of a targeted service process for the data isolation system.

FIG. 4 illustrates a targeted service process system 400. The targeted service process system 400 may operate in conjunction with a data reconciliation system 300 to provide targeted services without transferring PII from customer data holders. In this embodiment, the targeted service process system 400 includes a service provider data analysis hub 402, a customer data holder ID management system 404 and a service provider ID management system 406.

The service provider data analysis hub 402 may be any computer system, servers or cloud environment. The service provider data analysis hub 402 performs data analysis to identify target populations. In this embodiment, the data analysis is based on data holder and service provider non-PII attributes and information associated with service provider IDs.

The service provider data analysis hub 402 is in communication with the customer data holder ID management system 404 and the service provider ID management system 406. In some embodiments, the communication is over a network 110 with one or both ID management systems 406. Other embodiments may include local connections, alternative networks or combinations of networks. For example, the service provider data analysis hub 402 may communicate with the customer data holder ID management system 404 over the Internet and the service provider ID management system 406 over a wired connection. In some embodiments, the service provider data analysis hub 402 and the service provider ID management system 406 may be partially integrated or in the same server system.

An embodiment of the targeted service process flow is illustrated in the targeted service process system 400. In this embodiment, the process begins with step 410, wherein the service provider data analysis hub 402 selects target audience IDs based on campaign requirements and information correlated with audience information and attributes.

The campaign requirements may be provided through a request portal or other communication system from the data holder, a partner or other party. For example, an authorized employee of the data holder may request an advertising campaign for a college checking account opportunity using a phone 102 to access a service provider portal.

In other embodiments, the campaign requirements may be defined or developed within the service provider data analysis hub 402. For example, the service provider may be a targeted advertising vendor for the data holder who develops and creates advertising campaigns on the data holder's behalf. In such embodiments, the service provider data analysis hub 402 may create campaigns based on the data analysis to maximize likely audience conversions based on the targeted campaign.

The audience information and attributes include information from the data holder, external sources, social media profiles, website cookies and other sources. This information may be stored in the service provider databases that are within or accessible to the service provider data analysis hub 402. The audience information and attributes does not include PII in some embodiments.

The service provider data analysis hub 402 selects the target audience through this analysis and identifies the corresponding solution IDs for the target audience. Non-PII data fields in campaign extracts are populated in step 412. Any PII data fields in the campaign extracts remain empty through the process within the service provider data analysis hub 402.

In step 414, the service provider data analysis hub 402 uses the solution IDs to determine the proper ID management solution for completing the campaign extract with PII. The proper ID management solution is determined based on whether the service provider has PII for the campaign fulfilment or if only the data holder has the PII. In order to check this, the service provider data analysis hub 402 may communicate with a reconciliation database or cross-reference database to confirm whether PII is available for the selected solution IDs. In some embodiments, the service provider data analysis hub 402 may include a database having the solution IDs and flags or indicators associated with each solution ID that identify whether the service provider holds PII for the solution ID. If the indicator shows that the PII is available in the service provider system, the service provider ID management system 406 is selected. If the service provider system does not have PII, the customer data holder ID management system 404 is selected.

In step 416, the service provider data analysis hub 402 splits the campaign extracts into groups based on the selected ID management solution. The service provider data analysis hub 402 sends a service provider group of the campaign extracts to the service provider ID management system 406 and the customer data holder group of campaign extracts to the customer data holder ID management system 404.

The customer data holder ID management system 404 and service provider ID management system 406 follow similar processes to complete the campaign extracts and complete fulfilment and distribution. The customer data holder ID management system 404 performs step 420 to populate PII data fields in the campaign extracts. The PII data fields are populated from a customer data holder PII database. Once the campaign extracts are completed with customer data holder PII information, the campaign extracts are sent to a fulfilment channel in step 422.

Within the service provider ID management system 406, the service provider PII is populated into PII data fields in the campaign extracts in step 424. The completed campaign extracts are sent to the fulfilment channel in step 426.

In some embodiments, the same fulfilment channel may be used to fulfill the distribution of the campaign using completed campaign extracts from both the customer data holder ID management system 404 and the service provider ID management system 406. In other embodiments, different fulfilment channels are used for distribution.

This embodiment facilitates a targeted campaign through a service provider while the customer data holder maintains PII isolated from the service provider. The service provider can receive and analyze customer attributes and non-PII information tied to a solution ID. The campaign is tailored and the target audience is identified by non-PII information and solution ID. At no time is PII provided by the data holder to the service provider system.

Figure 5:
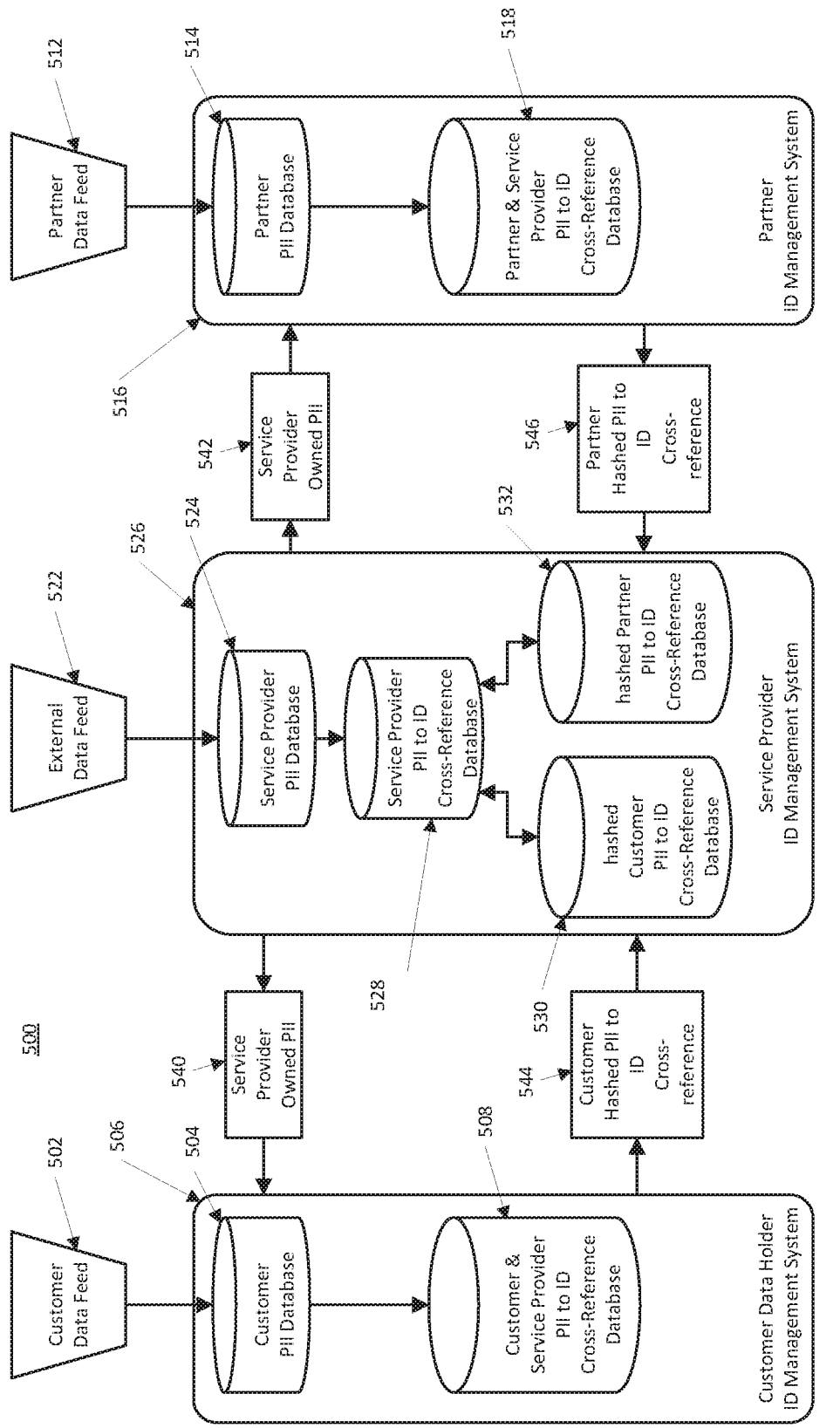
FIG. 5 shows another embodiment of a data isolation system.

FIG. 5 illustrates another data isolation system 500. In this embodiment, the data isolation system 500 facilitates correlation services between other parties. The service provider acts as a clearinghouse between a customer data holder and a partner data holder.

This embodiment includes a customer data feed 502 providing information to a customer data holder ID management system 506. The customer ID management system 506 includes a customer PII database 504 and customer and service provider PII to ID cross-reference database 508. The customer PII database 504 stores customer PII received from the customer data feed 502 and any updates received from the service provider via the external data feed 522. The customer and service provider PII to ID cross-reference database 508 may include solution IDs and related information or associations.

The data isolation system 500 also includes a partner data feed 512 and partner ID management system 516. Embodiments of the data isolation system may include multiple partners and partner systems. The partner ID management system 516 includes a partner PII database 514 and partner and service provider PII to ID cross-reference database 518. The partner PII database 514 stores partner PII received from the partner data feed 512 and any updates received from the service provider via the external data feed 522. The partner and service provider PII to ID cross-reference database 518 may include solution IDs and related information or associations.

The data isolation system 500 also includes a service provider ID management system 526 that receives information from an external data feed 522. In this embodiment, the service provider ID management system 526 includes a service provider PII database 524, a service provider PII to ID cross-reference database 528, a hashed customer PII to ID cross-reference database 530 and a hashed partner PII to ID cross-reference database 532.

The service provider PII database 524 stores service provider PII received from the external data feed 522 or determined through other systems. The service provider PII to ID cross-reference database 528 includes solution IDs correlated to the service provider PII. In some embodiments, the service provider PII to ID cross-reference database 528 may include solution IDs from or based on the customer or partner ID management systems 506 and 516. The service provider ID management system 526 may manage these solution IDs without holding any PII for the people represented by the solution IDs.

The hashed customer PII to ID cross-reference database 530 is used to reconcile the customer data holder solution IDs with solution IDs in the service provider ID management system 526. This reconciliation may be based on matching hashed customer PII with hashed service provider PII. Similarly, the hashed partner PII to ID cross-reference database 532 is used to reconcile the partner solution IDs with solution IDs in the service provider ID management system 526. This reconciliation may be based on matching hashed partner PII with hashed service provider PII.

During the reconciliation process, the service provider ID management system 526 reconciles solution IDs with the customer data holder ID management system 506 and the partner ID management system 516. The service provider ID management system 526 sends a service provider to data holder transmission 540 to the customer data holder ID management system 506 and a service provider to partner transmission 542 to the partner ID management system 516. In this embodiment, the service provider PII is labeled service provider owned PII to indicate the service provider's ability to transmit the PII. Those skilled in the art will recognize that this ability to transmit may be based on the service provider's license, control or possession of the service provider PII, and the service provider may not own rights to the collected PII.

The customer data holder ID management system 506 receives the service provider transmissions 540, and the partner ID management system 516 receives the service provider transmissions 542. Each ID management system 506 and 516 may update information in the PII databases 504 and 514 based on a correlation of solution IDs using the ID cross-reference databases 508 and 518. This correlation process may identify matching solution IDs and PII, partially matching solution IDs and PII or unmatched solution IDs and PII.

For matching solution IDs and PII, no update may be necessary. Partially matched solution IDs and PII may cause the information associated with the solution ID entry in the customer PII database 306 or partner PII database 514 to be updated. Any solution IDs and PII that are unmatched may be entered as new solution ID entries in the PII databases 504 or 514. In addition, the customer PII database 504 or partner ID database 514 may include additional solution IDs that are not correlated to the solution IDs and PII received from the service provider transmissions 540 or 542.

Once the customer data holder ID management system 506 and the partner ID management system 516 are updated, they may send information to the service provider ID management system 526. Prior to sending information, the ID management systems 506 and 516 may apply a hash algorithm to the PII to create hashed PII characters. The customer data holder ID management system 506 sends a data holder transmission 544 to the service provider ID management system 526 that includes the hashed customer PII characters for reconciliation and may include corresponding solution IDs. Similarly, the partner ID management system 516 sends a partner transmission 546 to the service provider ID management system 526 that includes the hashed partner PII characters for reconciliation and may include corresponding solution IDs. In some embodiments, the information from one or both ID management systems 506 or 516 may be limited to partially matched, unmatched, data holder only or partner only solution IDs.

The service provider ID management system 526 hashes the service provider PII contained in the service provider PII database 524. The service provider ID management system 526 uses the same hash algorithm and formats the PII the same way as the customer data holder ID management system 506 and partner ID management system 516. In some embodiments, the service provider ID management system 526 may create a series of hashes for a solution ID that includes alternative PII information, such as nicknames, titles, designations or other information that may affect the hash. After creating the service provider hashed PII, the service provider ID management system 526 compares the service provider hashed PII to the received customer hashed PII and partner hashed PII to determine if the service provider PII database 524 includes the corresponding PII.

Within the hashed customer PII to ID cross-reference database 530, the system may match the hashed PII to confirm that the service provider PII database includes the same person. If there is a hashed PII match, the service provider ID management system 526 may confirm that the solution ID is the same in the service provider ID management system 526 as the solution ID in the customer data holder transmission 544. If the hashed PII does not match, the service provider ID management system 526 may determine that the additional customer data holder hashed PII represent new profiles for people, entities, households, addresses or other groupings. The service provider ID management system 526 may assign new solution IDs to these new people and entities or update the service provider PII to ID cross-reference database with the solution ID provided in the customer data holder transmission 544.

Within the hashed partner PII to ID cross-reference database 532, the system may match the hashed PII to confirm that the service provider PII database includes the same profile. If there is a hashed PII match, the service provider ID management system 526 may confirm that the solution ID is the same in the service provider ID management system 526 as the solution ID in the partner transmission 546. If the hashed PII does not match, the service provider ID management system 526 may determine that the additional partner hashed PII represent new people or entities. The service provider ID management system 526 may assign new solution IDs to these new profiles or update the service provider PII to ID cross-reference database with the solution ID provided in the customer data holder transmission 546.

Following these reconciliations, the confirmed solution IDs and any new solution IDs are stored in the service provider PII to ID cross-reference database 528. The service provider ID management system 526 may confirm which solution IDs were present in both hashed cross-reference databases 530 and 532 to determine the common people and entities in both the data holder and the partner systems.

In some embodiments, the service provider ID management system 526 may also compare customer hashed PII with partner hashed PII. This comparison may be limited to hashed PII that does not match service provider hashed PII or a solution ID that is common to both the customer data holder and the partner after reconciliation of the service provider ID management system 526 with both the data holder and partner systems.

Once the reconciliation process is finished in the service provider ID management system 526, the service provider ID management system 526 may send a second set of service provider transmissions 540 and 542 to the customer data holder ID management system 506 and the partner ID management system 516. These service provider transmissions 540 and 542 may identify common solution IDs between the customer data holder and the partner. In some embodiments, the service provider transmissions 540 and 542 may also indicate new and updated solution IDs.

Figure 6:
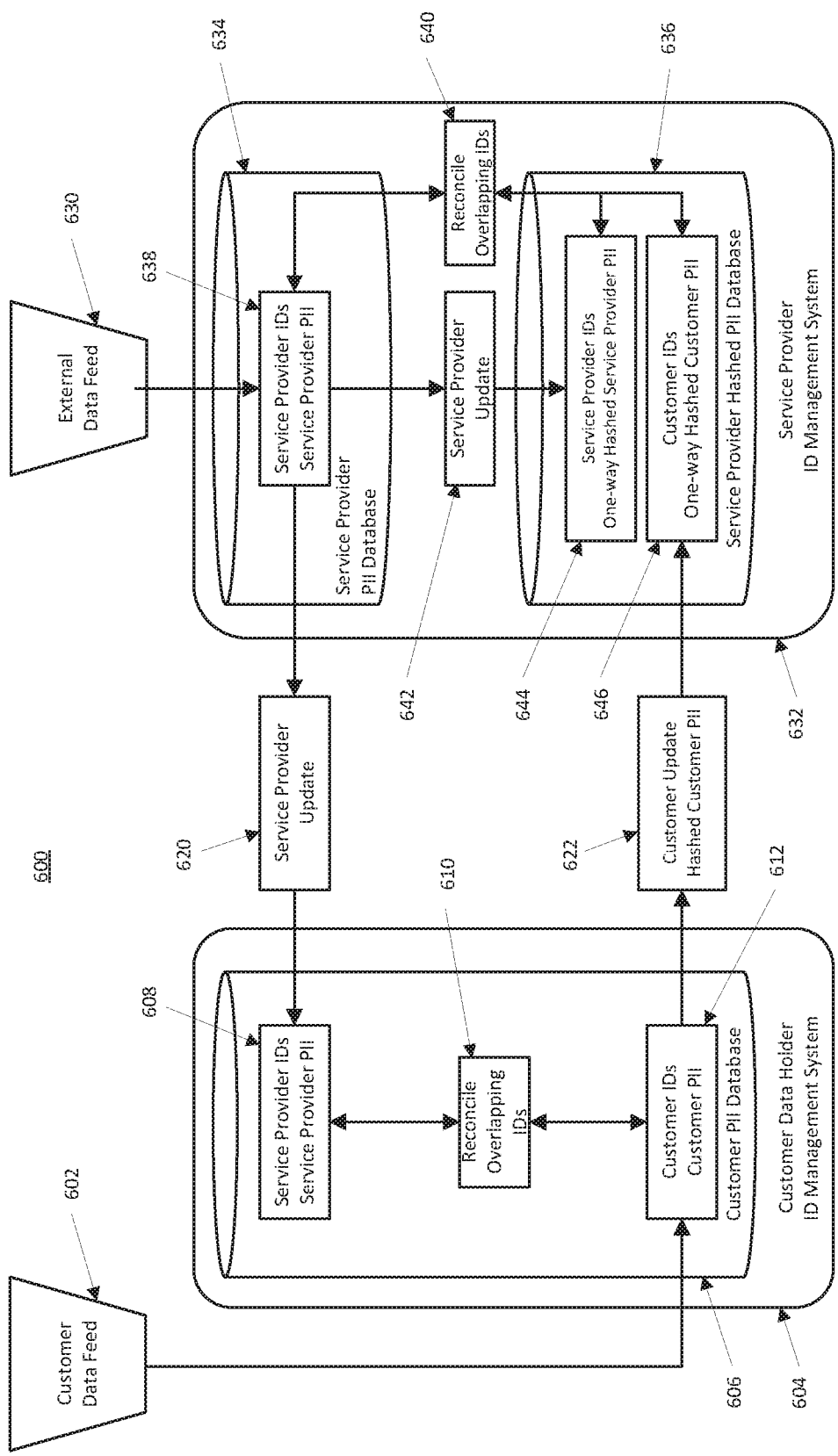
FIG. 6 shows another embodiment of a reconciliation process for the data isolation system.

FIG. 6 shows another illustration of a data reconciliation system 600. This data reconciliation system 600 may be used to reconcile two ID management systems, such as those in data isolation systems 200 and 500. This data reconciliation system 600 includes a customer data holder ID management system 604 and service provider ID management system 632.

The customer data holder ID management system 604 receives information from a customer data feed 602 and includes a customer PII database 606. The customer PII database 606 stores PII data received from the customer data feed 602 and solution IDs. Additional non-PII information and customer attributes from the customer data feed 602 may be stored in another database that is within or associated with the data holder system.

The service provider ID management system 632 receives information from an external data feed 630 and includes a service provider PII database 634 and a service provider hashed PII database 636. The service provider PII database 634 stores PII data received from the external data feed 630 and solution IDs. Additional non-PII information and attributes from the external data feed 630 may be stored in another database that is within or associated with the service provider system.

A reconciliation flow process is illustrated within the system components for this reconciliation system 600. In this embodiment, the reconciliation process uses separate service provider IDs and customer IDs for the solution IDs discussed with the other data isolation systems 200 and 500.

Service provider ID management system 632 receives the external data feed 630 and updates or creates service provider Phi and service provider IDs in box 638. In addition, the customer ID management system 604 receives the customer data feed 602 and updates or creates customer Phi and customer IDs in box 612.

During reconciliation, the service provider ID management system 632 then sends a service provider update in transmission 620. The customer data holder ID management system 604 receives the service provider update including service provider IDs and service provider PII in box 608.

In this embodiment, overlapping IDs are reconciled in box 610 within the customer PII database 606. The customer data holder ID management system 604 compares service provider IDs with customer IDs and compares service provider PII with customer PII in the customer PII database 606. This reconciliation results in fully matched service provider and customer IDs, partially matched service provider and customer IDs and unmatched service provider and customer IDs. When the customer data holder ID management system identifies partially matched service provider and customer IDs, the customer PII database 606 may be updated with information from the service provider transmission 620.

Once the reconciliation is complete, the customer data holder ID management system 604 hashes certain customer PII for reconciliation. The customer data holder ID management system 604 sends a customer update with the hashed customer PII in a data holder transmission 622 to the service provider ID management system 632. The customer update is received by the service provider ID management system 632 and stored in the service provider hashed customer PII database 636 as shown in box 646.

In addition, the service provider ID management system 632 also provides an internal service provider update illustrated in box 642 from the service provider PII database 634 to the service provider hashed PII database 636. This service provider update includes hashed service provider PII created by the service provider ID management system 632 using the same hash algorithm and PII format. In some embodiments, the service provider ID management system 632 creates multiple hashes using different PII formats, including nicknames, titles, designations and other information.

The service provider IDs and hashed service provider PII is stored in the service provider hashed PII database 636 as shown in box 644. The service provider ID management system 632 then reconciles the service provider hashed PII with the hashed customer PII to determine overlapping IDs in box 640. This reconciliation includes matching hashed customer PII characters with hashed service provider PII characters. For each match, the service provider hashed PII database 636 correlates the corresponding customer ID with the corresponding service provider ID. The overlapping IDs may be identified in the service provider PII database 634.

For hashed PII that does not match, the service provider ID management system 632 may assign a new service provider ID to correspond with the unmatched customer ID. This service provider ID may be stored in the service provider PII database 634 without any PII.

The service provider ID management system 632 may send a second service provider transmission 620 to reconcile the new or updated service provider IDs. These may include newly assigned service provider IDs based on the unmatched customer IDs. In some embodiments, the updated service provider IDs may include matches that were based on alternative PII formats, such as nicknames, titles, designations or other combinations. The service provider transmission may include format updates for the PII in the customer PII database 606.

This data reconciliation system 600 and process may also reconcile IDs with one or more additional parties, including data holder partners. In such embodiments, the reconciliation may include additional steps to reconcile unmatched hashed PII characters between the additional parties without exchanging PII.

Figure 7:
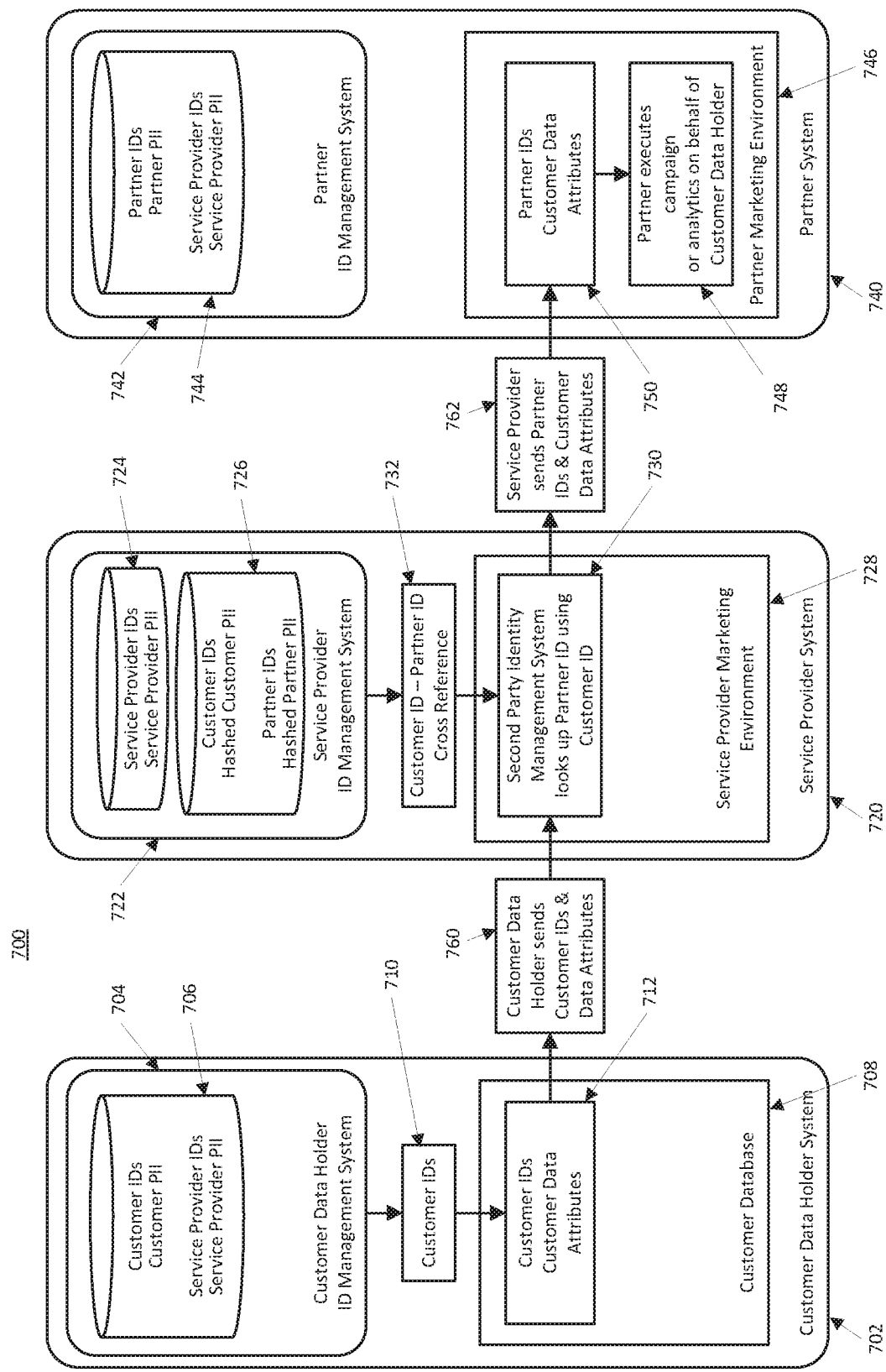
FIG. 7 shows another embodiment of a targeted service process for the data isolation system.

FIG. 7 shows another embodiment of a targeted service process within a data isolation system 700. The data isolation system 700 includes a customer data holder system 702, a service provider system 720 and a partner system 740.

The customer data holder system 702 includes a customer data holder ID management system 704 with a PII database 706. In this embodiment, the customer data holder system 702 also includes a customer database 708, which stores customer IDs associated with customer data attributes as illustrated in box 712. The customer database 708 may store additional non-PII information as well.

The service provider system 720 includes a service provider ID management system 722 with a PII database 724 and a hashed reconciliation database 726. In this embodiment, the service provider system 720 also includes a service provider marketing environment 728.

The partner system 740 includes a partner ID management system 742 with a PII database 744. In this embodiment, the partner system 740 also includes a partner marketing environment 746.

The data isolation system 700 reconciles the customer IDs, service provider IDs and partner IDs using one or more reconciliation processes described herein. The service provider ID management system 722 reconciles with the customer data holder ID management system 704 and the partner ID management system 742. In some embodiments, the ID management systems 704, 722 and 742 operate the same software program and reconcile in the same way. In other embodiments, the customer data holder ID management system 704 may use one reconciliation process and the partner ID management system 742 may use a different reconciliation process. The service provider ID management system 722 may reconcile with both reconciliation processes and internally correlate service provider IDs reconciled from both systems.

In this embodiment, the partner may provide a campaign or data analytics for the customer data holder. The targeted service requires the partner and customer IDs to correlate so that the partner's service is tied to the data holder's customers. Unlike existing systems, the data isolation system 700 facilitates the partner's targeted service without requiring the transfer of customer PII from the data holder.

First, the customer data holder system 702 may send customer IDs that have been reconciled to the customer database 708 to identify the customer attributes to send as illustrated in box 710. The reconciliation process between ID management systems 704, 722 and 742 determines customer IDs that correlate to partner IDs. These customer IDs 710 are provided to the customer database 708 to ensure transferred customer attributes correspond to partner IDs.

The data holder transmission 760 includes customer IDs and customer data attributes. The service provider system 720 receives the customer IDs and customer data attributes in the service provider marketing environment 728. In this embodiment, the service provider system 728 also sends an internal transmission 732 from the service provider ID management system 722 to the service provider marketing environment 728. This internal transmission includes a customer ID to partner ID cross-reference created through the reconciliation process.

The service provider marketing system 728 associates the customer data attributes with the partner IDs based on the customer ID to partner ID cross-reference. The service provider then sends a service provider transmission 762 to the partner system 740 having the customer attributes with the partner IDs.

The partner system 740 receives the service provider transmission 762 in the partner marketing environment 746. As shown in box 750, the partner IDs with customer attributes are stored in the partner marketing environment 746 for analysis. As illustrated in box 748, the partner marketing environment 746 executes the partner campaign or analytics based in part on the customer attributes received.

In some embodiments, the partner system campaign may require fulfilment using PII that is only available through the data holder. The service provider may receive campaign extracts for fulfilment and return the campaign extracts to the data holder for fulfilment using customer PII. The service provider may use the same customer ID to partner ID cross-reference to return campaigns or data from the partner.

The invention being thus described and further described in the claims, it will be obvious that the same may be varied in many ways. Such variations are not to be regarded as a departure from the spirit and scope of the invention, and all such modifications as would be obvious to one skilled in the art are intended to be included within the scope of the apparatus described.

The invention claimed is:

1. A data isolation system for information security between a data holder and a service provider comprising:
   a data holder computer system comprising:
      a data holder isolation database that stores restricted customer information and a customer ID that represents a customer, wherein the restricted customer information is isolated in the data holder isolation database,
      a data holder ID management system operably connected to the data holder isolation database, wherein the data holder ID management system includes a customer ID cross-reference database and a data holder ID management processor, and
      a data holder network communication component;
   a service provider computer system comprising:
      a service provider database that stores personal information received from sources external to the data holder computer system and assigns a service provider ID that represents the personal information corresponding to a profile,
      a service provider ID management system operably connected to the service provider database, wherein the service provider ID management system includes a service provider cross-reference database, a hashed cross-reference database and a service provider ID management processor, and
      a service provider network communication component;
   wherein the service provider ID management system sends a first service provider transmission via the service provider network communication component to the data holder ID management system, and the first service provider transmission includes the service provider ID and the personal information corresponding thereto;
   wherein the data holder ID management system receives the first service provider transmission and the data holder ID management processor reconciles the service provider ID with the customer ID to identify a first overlapping ID and non-overlapping ID based on whether the personal information corresponds to the restricted customer information, and the non-overlapping ID includes the customer ID for the restricted customer information that does not match the personal information for the service provider ID;

wherein the data holder ID management system correlates the service provider ID and the customer ID that are identified as the overlapping ID within the customer ID cross-reference database;

wherein the data holder ID management system hashes the restricted customer information to create hashed customer information corresponding to the customer ID and sends a data holder transmission via the data holder network communication component to the service provider ID management system, wherein the data holder transmission includes the non-overlapping ID and the hashed customer information corresponding to the non-overlapping ID;

wherein the service provider ID management system receives the data holder transmission and the service provider ID management processor hashes the personal information in the service provider database to create hashed personal information corresponding to the service provider ID, and wherein the service provider ID management system reconciles the service provider ID with the customer ID received in the data holder transmission by matching the hashed customer information with the hashed personal information to identify at least one of a second overlapping ID, an unmatched service provider ID and an unmatched customer ID;

wherein the service provider ID management system correlates the service provider ID and the customer ID that are identified as the second overlapping ID within the service provider ID cross-reference database, and wherein the service provider ID management system assigns a new service provider ID to the unmatched customer ID and stores the new service provider ID correlated to the unmatched customer ID within the service provider ID cross-reference database;

wherein the service provider ID management system sends a second service provider transmission via the service provider network communication component to the data holder ID management system, wherein the second service provider transmission includes the customer ID correlated with the service provider ID and the new service provider ID correlated to the unmatched customer ID; and wherein the data holder ID management system updates the data holder ID cross-reference database with the customer ID correlated with the service provider ID and the new service provider ID correlated to the unmatched customer ID.

2. The data isolation system of claim 1, wherein the data holder computer system receives a customer data feed, including the restricted customer information and customer attributes.

3. The data isolation system of claim 1, wherein the data holder computer system further comprises a customer attribute database that stores customer attributes that are not the restricted customer information and a service environment system that analyzes information to provide a targeted service for the data holder.

4. The data isolation system of claim 3, wherein the data holder computer system sends the customer attributes with the customer ID to the service environment system, and wherein the service environment system conducts an analysis of the customer attributes and additional information to identify a target audience for a data holder campaign, determines members of the target audience for which the service provider ID management system does not store personal information, and sends the data holder campaign for the members to a data holder fulfilment hub.

5. The data isolation system of claim 1, wherein the non-overlapping ID includes partially matching customer IDs and service provider IDs.

6. The data isolation system of claim 1, wherein the restricted customer information comprises a plurality of customer personally identifiable information entries and the data holder ID management system hashes only a portion of the plurality of customer personally identifiable information entries to create the hashed customer information; and wherein the personal information in the service provider database comprises a plurality of profile personally identifiable information entries and the service provider ID management system hashes only a portion of the plurality of profile personally identifiable information entries to create the hashed personal information.

7. The data isolation system of claim 6, wherein the data holder ID management system formats the portion of the plurality of customer personally identifiable information entries prior to creating the hashed customer information;

wherein the service provider ID management system formats the portion of the plurality of profile personally identifiable information entries prior to creating the hashed personal information; and wherein the data holder ID management system and the service provider ID management system use the same format.

8. A method for data isolation between networked participants for information security comprising:

receiving an external data feed of information, including first personally identifiable information (first PII) in a service provider ID management system, wherein the service provider ID management system includes a service provider PII database, a service provider cross-reference database and a hashed cross-reference database;

storing the first PII in the service provider PII database with a service provider ID;

sending a first service provider transmission, including the first PII and the service provider ID that corresponds to the first PII, to a data holder ID management system, wherein the data holder ID management system includes a data holder PII database and a data holder cross-reference database and stores customer PII with a corresponding customer ID in the data holder PII database, wherein the customer PII is not shared with the service provider ID management system;

receiving a data holder transmission, including hashed customer PII corresponding to the customer ID that corresponds to the customer PII that is different than the first PII, wherein the data holder ID management system reconciles the first PII with the customer PII to determine the customer ID to send in the data holder transmission;

hashing the first PII to create hashed first PII and loading the hashed first PII and the hashed customer PII in the hashed cross-reference database;

comparing the hashed customer PII with the hashed first PII to determine matching hashed PII entries, wherein remaining hashed customer PII entries are not in the service provider PII database when the comparison occurs;

correlating the service provider ID to the customer ID for each of the matching hashed PII entries and storing the service provider ID and the customer ID as correlated entries in the service provider cross-reference database;

assigning new service provider IDs for the customer IDs that do not correspond to the matching hashed PII entries and are in the remaining hashed customer PII entries; and sending a second service provider transmission to the data holder ID management system with the new service provider IDs and the service provider IDs that are updated based on the matching hashed PII entries.

9. The method for data isolation of claim 8, further comprising:

receiving customer attributes and the customer ID from a data holder system;

determining a targeted audience campaign based on the customer attributes;

determining members of the targeted audience for which the customer PII is not in the first PII, and sending the targeted audience campaign to a data holder fulfilment hub for each of the members for combining with the customer PII.

10. The method for data isolation of claim 8, further comprising:

sending a third service provider transmission, including the first PII and the service provider ID that corresponds to the first PII to a partner ID management system, wherein the partner ID management system includes a partner PII database and a partner cross-reference database and stores second PII with a corresponding partner ID in the partner PII database;

receiving a partner transmission, including hashed second PII corresponding to the partner ID that corresponds to the second PII that is different than the first PII, wherein the partner ID management system reconciles the first PII with the second PII to determine the partner ID to send in the partner transmission;

comparing the hashed second PII with the hashed first PII to determine matching service provider to partner hashed PII entries;

correlating the service provider ID to the partner ID for each of the matching service provider to partner hashed PII entries and storing the service provider ID and the partner ID as correlated entries in the service provider cross-reference database;

assigning new service provider IDs for the partner IDs that do not correspond to the matching service provider to partner hashed PII entries;

sending the second service provider transmission to the partner ID management system with the new service provider IDs and the service provider IDs that are updated based on the matching service provider to partner hashed PII entries.

11. The method for data isolation of claim 10, further comprising reconciling the partner IDs and the customer IDs to identify corresponding partner IDs and customer IDs.

12. The method for data isolation of claim 11, further comprising receiving customer attributes with the customer IDs from a data holder system, correlating the customer attributes with the partner IDs based on the corresponding partner IDs and customer IDs, and sending the customer attributes with the partner IDs to a partner system.

13. A data isolation and profile reconciliation system for information security between a data holder and a partner comprising:

a data holder computer system comprising:
a data holder isolation database that stores customer PII and a customer ID that represents a customer, wherein the customer PII is isolated in the data holder isolation database,
a data holder ID management system operably connected to the data holder isolation database, wherein the data holder ID management system includes a customer ID cross-reference database and a data holder ID management processor, and
a data holder network communication component;

a partner computer system comprising:
a partner isolation database that stores partner profile PII and a partner ID that represents a partner profile,
a partner ID management system operably connected to the partner isolation database, wherein the partner ID management system includes a partner ID cross-reference database and a partner ID management processor, and
a partner network communication component;

a service provider computer system comprising:
a service provider database that stores a service provider ID,
a service provider ID management system operably connected to the service provider database, wherein the service provider ID management system includes a service provider cross-reference database, a hashed cross-reference database and a service provider ID management processor, and
a service provider network communication component;

wherein the data holder ID management system hashes the customer PII to create hashed customer information corresponding to the customer ID and sends a data holder transmission via the data holder network communication component to the service provider ID management system, wherein the data holder transmission includes the customer ID and the hashed customer information corresponding to the customer ID;

wherein the partner ID management system hashes the partner profile PII to create hashed partner information corresponding to the partner ID and sends a partner transmission via the partner network communication component to the service provider ID management system, wherein the partner transmission includes the partner ID and the hashed partner information corresponding to the partner ID;

wherein the service provider ID management system receives the data holder transmission and the partner transmission, and wherein the service provider ID management system reconciles the partner ID with the customer ID by matching the hashed customer information with the hashed partner information to identify at least one of an overlapping ID, an unmatched partner ID and an unmatched customer ID;

wherein the service provider ID management system correlates the partner ID and the customer ID that are identified as the overlapping ID within the service provider cross-reference database, and wherein the service provider ID management system assigns the service provider ID to the overlapping ID and stores the service provider ID correlated to the customer ID and the partner ID within the service provider cross-reference database;

wherein the service provider ID management system sends a first service provider transmission via the service provider network communication component to the data holder ID management system, wherein the first service provider transmission includes the customer ID correlated with the service provider ID; and wherein the service provider ID management system sends a second service provider transmission via the service provider network communication component to the partner ID management system, wherein the second service provider transmission includes the partner ID correlated with the service provider ID.

14. The data isolation and profile reconciliation system of claim 13, wherein the first service provider transmission and the second service provider transmission each include a notice of the overlapping ID.

\* \* \* \* \*